United States Patent [19]

Humbrecht et al.

[11] Patent Number: 4,496,716
[45] Date of Patent: Jan. 29, 1985

[54] DRAW-TEXTURED, BASE-DYEABLE POLYESTER YARN

[75] Inventors: Remy Humbrecht, Reussbuhl; Heinrich Schmieder, Emmenbrucke, both of Switzerland

[73] Assignee: Viscosuisse S.A., Emmenbrucke, Switzerland

[21] Appl. No.: 556,247

[22] PCT Filed: Mar. 16, 1983

[86] PCT No.: PCT/CH83/00035
§ 371 Date: Nov. 29, 1983
§ 102(e) Date: Nov. 29, 1983

[87] PCT Pub. No.: WO83/03432
PCT Pub. Date: Oct. 13, 1983

[30] Foreign Application Priority Data

Mar. 30, 1982 [CH] Switzerland ............... 1935/82

[51] Int. Cl.³ .................. C08G 63/66; C08G 63/68
[52] U.S. Cl. .................. 528/295; 528/295.3; 528/300; 528/301
[58] Field of Search ............ 528/295, 295.3, 300, 528/301

[56] References Cited

U.S. PATENT DOCUMENTS

| 3,018,272 | 1/1962 | Griffing et al. ............ 528/295 X |
| 3,104,450 | 9/1963 | Christens et al. ........... 528/295 X |
| 3,922,250 | 11/1975 | Cleary ..................... 528/295 X |
| 4,250,296 | 2/1981 | Weckler et al. ............. 528/295 |
| 4,390,687 | 6/1983 | Tung ....................... 528/295 |
| 4,403,094 | 9/1983 | Sasaki et al. .............. 528/295 X |

Primary Examiner—Lucille M. Phynes
Attorney, Agent, or Firm—Seidel, Gonda & Goldhammer

[57] ABSTRACT

The invention relates to a thread with a proportion of a basic-dyeable, texturized polyester filament which contains a metal sulphonate containing the structural unit

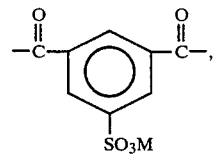

where M is equal to Na or K and a compound A containing structural units —$(CH_2)_y$— and/or —O—$(C_{x_1}H_{2x_1}O)_{y_1}$— where $x_1 \geq 2$, $y \geq 20$ and $x_1 y_1 \geq 20$.

The basic-dyeable polyester filament contains 1.0 to 5.0 mol % of metal sulphonate units and between 0.5 and 12% by weight of compound A.

15 Claims, No Drawings

DRAW-TEXTURED, BASE-DYEABLE POLYESTER YARN

The invention relates to a thread with a proportion of a basic-dyeable, texturised polyester filament.

Polyester filaments which have an affinity for basic dyestuffs have already been disclosed, and are obtained, for example, according to Swiss Pat. No. 373,559, by adding metal sulphonates. According to U.S. Pat. No. 3,772,872, such polyesters can even be melt-spun in a high-speed process. The preferred additives are sulphonic acid salts which contain the grouping

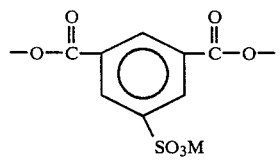

where M denotes a monovalent metal, and are added in the course of the preparation of polyethylene terephthalate.

However, these polyester filaments have the disadvantage that their mechanical properties, specifically their strength, are poor, in particular when they have been subjected to a false-twist draw-texturising operation. For this reason they, alone or together with other synthetic and/or natural fibres or filaments, are difficult to process.

On the other hand, U.S. Pat. No. 2,865,891 discloses that non-basic-dyeable polyesters with polyalkylene glycols containing the grouping $-)-(C_nH_{2n}O)_z-$ where $2 \leq n \leq 10$ and $10 \leq z \leq 150$ in the molecular chain are used for preparing yarns having improved dyeability with disperse dyestuffs. Polyesters modified in such a way can, according to U.S. Pat. No. 3,772,872, even be spun in a high-speed method. However, the addition of polyalkylene glycols to polyesters yields no improvement in respect of mechanical properties of draw-texturised filaments prepared therefrom.

It is an object of the present invention to prepare a thread containing basic-dyeable texturised polyester filaments, having improved mechanical yarn properties and being easier to process.

The invention relates to a thread with a proportion of a basic-dyeable, texturised polyester filament in which proportion the basic-dyeable polyester filament contains a metal sulphonate having the structural unit

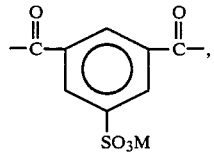

where M is equal to Na or K, and a compound A containing the structural units $-(CH_2)_y-$ and/or $-O-(C_{x_1}H_{2x_1}O)_{y_1}-$ where $x_1 \geq 2$, $y \geq 20$ and $x_1 \cdot y_1 \geq 20$.

The additives having the abovementioned structural units are incorporated into the polyester chain in the course of an esterification or transesterification. In the case of compound A it can also be present as a separate phase.

The polyester thread modified according to the invention is surprisingly strong, which fact enables efficient processing, alone or together with other synthetic and/or natural filaments or staple yarns. This modified thread is, moreover, white, and has, in addition to good textile properties, a particularly good affinity for basic dyestuffs. Furthermore, dyed with disperse dyestuffs it gives a relatively deep shade.

For the purposes of the invention, a filament is a yarn comprising several individual filaments.

The polyesters can be prepared in a conventional manner, for example in the case of copolyesters with polyethylene terephthalate either by directly condensing ethylene glycol and terephthalic acid or by transesterifying dimethyl terephthalate with ethylene glycol and then polycondensing the diglycol terephthalate formed as an intermediate. It is possible to replace ethylene glycol by other diols, such as 1,3-propanediol, 1,4-butanediol, 1,6-hexanediol or cyclohexanedimethanol, and to use in addition to terephthalic acid or dimethyl terephthalate other dicarboxylic acids, such as isophthalic acid, adipic acid, azelaic acid or dimeric fatty acid or the alkyl esters of these acids.

The sulphonic acid salt and compound A are added at or before the start of the polycondensation phase, preferably before the start of the esterification of terephthalic acid or transesterification of the dialkyl terephthalate with the glycol. The elimination of water or methanol in the course of the esterification or transesterification and of the glycol in the course of the subsequent polycondensation is effected in a known manner by means of catalysts and at elevated temperatures, as for the preparation of the homopolyester.

The amount of metal sulphonate added is between 1.0 and 5.0 mol %, preferably between 1.5 and 2.5 mol %, of metal sulphonate units. The metal sulphonate used is preferably the sulphonate of 3,5-isophthalic acid, when the polyester is prepared by esterification, or of dimethyl 3,5 isophthalate (sic), when the polyester is prepared by transesterification. The Na salt is preferably used. The amount of compound A added is between 0.5 and 12% by weight, preferably between 1 and 6% by weight, relative to polyester.

Compound A is preferably a polyalkylene glycol. Polyalkylene glycols are also referred to as polyglycols or as polyalkylene ethers or as polyoxyalkylene glycols or even as polyalkylene oxide glycols. Polyethylene glycols are preferably used, and are commercially available as CARBOWAX ® or POLYOX ®. Their average molecular weight can be between 400 and 50,000. Other polyalkylene glycols, namely polypropylene glycols, polytetrahydrofurans, which are also referred to as polytetramethylene glycols, for example the POLYRAN ® products from BAYER, and random copolyalkylene glycols, such as polyethylenepropylene glycols, are also commercially available. The molecular weight distribution of these polyalkylene glycols is relatively wide. Products which have a narrow molecular weight distribution and are free of coloured or acid-containing impurities are preferably used.

Other compounds A which can be used according to the invention are long-chain compounds having the structural units $-(CH_2)_y-$ where $y \geq 20$. Such compounds include the commercially available polyolefins such as polyethylene and polypropylene which are present in the polymer in the form of a separate phase, and difunctional compounds such as the dimeric (where $y = 34$), the trimeric (where $y = 52$) and tetrameric fatty acids (where y=68). The Empol 1010 product from Unilever Emergy represents the dimeric fatty acid, and UNEM 9360, also from Unilever Emery, represents the bis(hydroxyethyl)-dimeric fatty acid which has the chemical composition HOCH$_2$CH$_2$OOC—C$_{34}$H$_{68}$—COOCH$_2$CH$_2$OH, i.e. y=34. The former product is preferably used in an esterification method, and the latter product is used not only in an esterification but also a transesterification method in preparing the polyester.

Further compounds A which can be used according to the invention are compounds which contain not only the grouping —(CH$_2$)$_y$— but also —O—(C$_{x_1}$H$_{2x_1}$O)$_{y_1}$— where $x_1 \geq 2$, $y \geq 20$ and $x_1 \cdot y_1 \geq 20$. Such compounds are prepared, for example also by Unilever Emery, and used according to known esterification methods with the dimeric fatty acid and with polyalkylene glycols where $x_1 = 2$ and $x_1 \cdot y_1 \geq 20$. The polyalkylene glycol esters thus obtained are, for example, the products UNEM 9991 and UE 80385 which which have the chemical composition HOCH$_2$CH$_2$OOCC$_{34}$H$_{68}$COO—(CH$_2$CH$_2$O)$_{y_1}$COC$_{34}$H$_{68}$COOCH$_2$CH$_2$OH where the first product was prepared with a polyalkylene glycol which has a molecular weight of 1500, i.e. where $y_1$ is equal to 33, and the second product was prepared with a polyalkylene glycol which has a molecular weight of 1000, i.e. where $y_1$ is equal to 22. It is of course also possible to use other compounds where $y_1$ is greater than 10, for example $y_1 = 90$ or 200. These compounds have reactive terminal groups which enable the product to be incorporated into the polyester. Polyalkylene glycol esters can also be prepared using other dicarboxylic acids, such as adipic or terephthalic acid, in place of fatty acid.

Compounds A which contain the two groupings —(CH$_2$)$_y$— and —(C$_{x_1}$H$_{2x_1}$O)$_{y_1}$ also include polyalkylene glycol ester amides. To prepare these compounds, for example the commercial product UNEM 9993 from Unilever Emery, ethylenediamine is used, as a bonding member, in addition to dimeric fatty acid where y=34 and polyethylene glycol where $x_1 = 2$ and $y_1 = 22$.

Other compounds A which can also be used according to the invention and which contain polyalkylene glycol groupings are, for example, the ethoxylated triricinoleate of glycerol which has 12 to 60 carbon atoms or ethoxylated tertiary amines having the chemical composition

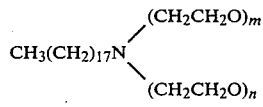

where m+n=35, or the tetroles which are described in column 2 of Swiss Pat. No. 587,930.

The radical which carries the polyalkylene glycol is of little importance provided it is short-chain. However, it must not additionally worsen customary thread properties, such as tensile strength or degree of whiteness. It only allows the groupings according to the invention to be introduced into the polymer chain. For instance, polyethylene terephthalate, or basic-dyeable polyester is generally prepared by using derivatives which contain terminal carboxyl groups in the case of an esterification with terephthalic acid or terminal ester or alcohol groups in the case of transesterification with dimethyl terephthalate. Compound A, if it is free of reactive terminal groups, can be added as early as during the preparation of the polymer if it does not additionally worsen customary thread properties. Otherwise, they can be introduced together with the polyester granules before the latter are melted.

The term "texturised" relates to texturised yarns which are obtained by conventional false-twisting. The superior strength of the novel thread is particularly marked in the false-twist draw-texturising of high-speed POY threads. The texturising can be carried out not only with a magnetic spindle but also with friction-based units. The count of the thread is immaterial. The novel thread can also be texturised subsequently or simultaneously.

The thread according to the invention contains 5 to 100% of the basic-dyeable polyester filament.

In the case where the novel thread consists of 100% of basic-dyeable polyester filaments, the modified polyester is spun at high speed, i.e. it is taken up at between 2,700 and 4,000 m/min, and then false-twist draw-texturised. In the case where the novel thread contains less than 100% of basic-dyeable polyester filaments, such methods of preparation as, for example, in European Pat. No. 22,065 are used. In this case, the basic-dyeable polyester is spun together with a second synthetic polymer, such as polyester or polyamide, and then draw-texturised. It is also possible to spin the two polymers separately and to combine them only at the draw-texturising stage. The filaments thus prepared can be used as such or are folded into yarns together with synthetic filaments or staple fibre yarns made of polyester, polyacrylic, viscose, nylon or natural fibres such as wool or cotton.

Such stabilisers as sodium acetate and special antioxidants such as IRGANOX ® 1222 or IRGANOX ® 259 from Ciba-Geigy can be added to the modified basic-dyeable polyester to improve the melt- and thermo-oxidative stability. More or less marked delustring is obtained by adding up to 2% of a titanium dioxide of the anatase type.

There now follows a description of details about the preparation and chemical properties of the polymer which is used for threads according to the invention.

PREPARATION OF THE POLYMER

A laboratory autoclave is charged with 6.2 kg of ethylene glycol, 10 kg of dimethyl terephthalate, 300 g of the monosodium salt of dimethyl 3,5-sulphoisophthalate (SIP) and 300 g of a polyethylene glycol which has a molecular weight of 4000, as compound A. 5 g of crystalline manganese acetate and 13 g of crystalline sodium acetate are added as transesterification catalyst. The mixture is heated to 230° C. in the course of 2.5 hours, during which the methanol liberated and excess glycol are distilled off under atmospheric pressure. The following substances are added in succession at 230° C.: 3 g of phosphorous acid, 50 g of titanium dioxide and 3.5 g of antimony trioxide. The mixture is heated up to 280° C. while the pressure is reduced to below 0.5 mbar. The vacuum is destroyed after 3.5 hours by passing in nitrogen, the polyethylene terephthalate melt is discharged from the autoclave in the form of a tape, and cooled, and the solidified polymer is cut up.

TLC analysis reveals the granules to have a melting point of 250° C. and a diethylene glycol content of 1.2% by weight. The polymer is white, and has a terminal carboxyl group concentration of 30 mol/t. The intrinsic viscosity as measured at 25° C. in a phenol/tetrachloroethane (1:1) mixture in accordance with H. Frind, Faserforschung (1954), page 296, is 0.62.

The polyester is dried in vacuo or with hot air to a water content of less than 0.01% by weight, and is spun in a conventional manner through spinnerets as in the following examples.

EXAMPLES 1 TO 3

Examples 1–3 describe the preparation of uniform yarns consisting of basic-dyeable, draw-texturised filaments.

3 different polymers were prepared from polyethylene terephthalate and SIP and compound A as in Table 1 by a method similar to that described above.

TABLE 1

| Example | SIP* added (%) | A** added (%) | $x_1$ | y or $y_1$ | $x_1 \cdot y_1$ | relative strength of texturised filaments (%) |
|---|---|---|---|---|---|---|
| 1 (comparison) | 3.4 | 0 | | | | 100 |
| 2 | 3.0 | 1.0 | $x_1 = 2$ | $y_1 = 90$ | 180 | 108 |
| 3 | 3.0 | 4.0 | $x_1 = 2$ | $y_1 = 34$ | 68 | 120 |

*SIP = sodium salt of dimethyl 3,5-sulphoisophthalate
**A = polyethylene glycol

The filament of Example 1 was prepared by prior art methods, whereas the filaments of Examples 2 and 3 were prepared in accordance with the invention.

The polymers were extruded on a conventional spinning machine, then cooled, converged, treated with spin-finish, and taken up at 3,100 m/min. The filament yarns consisted of 12 monofilaments, and had a count of 100 dtex. These filament yarns were then fed into a magnetic spindle draw-texturising machine, and were false-twist draw-texturised at a temperature of 190° C. with a stretching ratio of 1.45, with a false twist of 3,500 turns per minute and at a speed of 85 m/min. The strength of the draw-texturised filament yarns was measured with a TEXTIMAT tensile tester from Messrs. ZWICK, Ulm (West Germany). The strengths measured were expressed relative to the strength of Comparative Example 1, which was taken as 100%, and are listed as relative strengths in Table 1. Table 1 shows that the filaments of Examples 2 and 3, which were prepared according to the invention, are stronger than those of Comparative Example 1. The filaments are readily dyeable with basic dyestuffs.

EXAMPLES 4 TO 12

Examples 4 to 12 describe the preparation of mixed filament yarns from basic-dyeable and non-basic-dyeable filaments which are combined with one another before the draw-texturising stage and are draw-texturised together.

Table 2 shows the characteristics of the polymers made of polyethylene terephthalate, SIP and compound A and used to prepare the filament yarns:

TABLE 2

| Example | SIP* added (%) | A** added (%) | $x_1$ | y or $y_1$ | $x_1 \cdot y_1$ | relative strength of texturised filaments (%) |
|---|---|---|---|---|---|---|
| 4 | 3.4 | — | — | — | — | 100 |
| (comparison) 5 | 3.0 | 1* | $x_1 = 2$ | $y_1 = 9$ | 18 | 102 |
| (comparison) 6 | 3.0 | 6* | $x_1 = 6$ | $y_1 = 1$ | 6 | 75 |
| (comparison) 7 | 3.0 | 1* | $x_1 = 2$ | $y_1 = 90$ | 180 | 125 |
| 8 | 3.0 | 6* | $x_1 = 2$ | $y_1 = 90$ | 180 | 183 |
| 9 | 3.0 | 12* | $x_1 = 2$ | $y_1 = 90$ | 180 | 180 |
| 10 | 2.7 | 4* | $x_1 = 4$ | $y_1 = 50$ | 200 | 178 |
| 11 | 3.0 | 10** | — | $y = 34$ | — | 165 |
| 12 | 3.0 | 6** | — | $y = 34$ | — | 119 |

*Polyalkylene glycol
**UNEM ® 9360 from Unilever Emery, Holland

Examples 4 to 6 were not prepared in accordance with the invention, while the filament yarns of Examples 7 to 12 were prepared in accordance with the invention.

The polymers were spun in the same way as in Examples 1 to 3 into filament yarns which had a count of 100 dtex and consisted of 12 monofilaments. The same spinning machine was then used to spin polyethylene terephthalate polymer without SIP or compound A into filament yarns having a count of 150 dtex and consisting of 36 monofilaments at a rate of spinning which was 0–40% less than 3,100 m/min. The 100-dtex 12-monofilament yarns were then paired with a 150-dtex 36-filament yarn and fed into a magnetic spindle draw-texturising machine, where the two filament yarns were combined prior to draw-texturising and draw-texturised together. The draw-texturising machine settings were the same as those of Examples 1 to 3 except for the amount of false twist, which was reduced to 2,514 turns per meter. The draw-texturised mixed filaments, which consisted of the two parts, were tested for strength with the same tensile tester, and the measured relative strengths are listed in Table 2. Table 2 shows that, compared with Comparative Examples 4 to 6, the novel filament yarns of Examples 7 to 12 are stronger.

All mixed filaments were dyed with the basic dyestuff Basacryl Blue GL from BASF AG in the presence of the carrier Carolid from Tanatex Chem. Corp., the result of the dyeing being that filaments made from polymers containing SIP were dyed dark blue while the component threads made of polymers without SIP were left undyed, which combination gave two-coloured mixed filaments. While the filaments of Comparative Examples 4–6 gave rise to problems on further processing, the filaments of inventive Examples 7–12 could be processed without difficulties, by virtue of their greater strength.

EXAMPLES 13 TO 19

Examples 13 to 19 describe the preparation of mixed filament yarns from basic-dyeable filaments and non-basic-dyeable filaments which are combined with one another as early as after the extruding and cooling-down stages and are then draw-texturised.

These examples were carried out with the polymers of polyethylene terephthalate, SIP and compound A which are given in Table 3.

TABLE 3

| Example | SIP* added (%) | A** added (%) | $x_1$ | y or $y_1$ | $x_1 \cdot y_1$ | relative strength of texturised filaments (%) |
|---|---|---|---|---|---|---|
| 13 (comparison) | 3.4 | 0 | — | — | — | 100 |
| 14 | 3.0 | 4* | $x_1 = 2$ | $y_1 = 34$ | 68 | 174 |
| 15 | 3.0 | 4* | $x_1 = 2$ | $y_1 = 450$ | 900 | 178 |
| 16 | 3.4 | 4* | $x_1 = 2$ | $y_1 = 90$ | 180 | 158 |
| 17 | 3.4 | 4* | $x_1 = 2$ | $y_1 = 90$ | 180 | 197 |
| 18 | 3.0 | 5*** | $x_1 = 2$ | $y = 68$ $y_1 = 33$ | 66 | 150 |
| 19 | 3.0 | 2**** |  | $y = 2000$ |  | 127 |

*Polyalkylene glycol
***UNEM 9991 ® from Unilever Emery
****Polyethylene having a molecular weight of 28,000

The filament of Example 13 was prepared by a prior art method, while the filaments of Examples 14 to 19 were prepared in accordance with the invention.

The polymers were dried and extruded into filaments on a spinning machine designed for the simultaneous processing of 2 polymers. This machine (a cospinning machine) has 2 separate lines, E and F, which lead to a joint spinneret plate where polymer from line E is extruded through some of the capillaries at the spinneret and polymer from line F is extruded through the other capillaries. On cooling, the filaments are converged to give a mixed filament yarn, which is provided with spin-finish and taken up at 3,300 m/min.

The polymers of Table 3 were in each case extruded in line E, while line F processed polyethylene terephthalate free of SIP and compound A. The mixed filament yarn obtained had a count of 235 dtex and consisted of 48 monofilaments.

The mixed filament yarns containing polymer E and polymer F of Examples 13 to 16 were texturised on a magnetic spindle draw-texturising machine, where the stretching ratios had been reduced, by comparison with the setting of Examples 4 to 12, to 1.35. The mixed filament yarns containing polymer F of Examples 17 to 19 were texturised on a frictional draw-texturising machine using a stretching ratio of 1.48, a temperature of 190° C. and a speed of 600 m/min.

The strength of the mixed filament yarns obtained was tested on a Textimat tensile tester. The relative strengths are listed in Table 3. Compared with Comparative Example 13, the filaments of Examples 14 to 19, which were prepared in accordance with the invention, are stronger. Filaments made of polymers of Table 3 are readily dyeable with basic dyestuffs, and do not present any problems on further processing.

The favourable properties of the novel filament yarns are preserved when, after the draw-texturising, the filaments are heat-set in a second heater and/or are entangled with an appropriate air jet. The favourable properties of the novel filament yarns are also preserved when different yarn counts or different spinning speeds and draw-texturising speeds are used. The favourable properties are similarly preserved when these filament yarns are folded into yarns with filaments or staple fibre yarns made of synthetic or natural fibres.

We claim:

1. Thread with a proportion of a basic-dyeable, texturised polyester filament, characterised in that the basic-dyeable polyester filament contains a metal sulphonate containing the structural unit

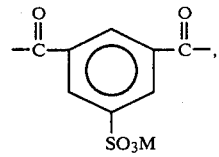

where M is equal to Na or K and a compound A containing the structural units $-(CH_2)_y-$ and/or $-O-(C_{x_1}H_{2x_1}O)_{y_1}-$ where $x_1 \geq 2$, $y \geq 20$ and $x_1 y_1 \geq 20$.

2. Thread according to claim 1, characterised in that the basic-dyeable polyester filament contains 1.0 to 5.0, preferably between 1.5 and 2.5, mol % of metal sulphonate units.

3. Thread according to claims 1 or 2, characterised in that the basic-dyeable polyester filament contains between 0.5 and 12%, preferably between 1 and 6%, by weight of compound A.

4. Thread according to claims 1 or 2, characterised in that the metal sulphonate is the sodium salt of dimethyl 3,5-sulphoisophthalate.

5. Thread according to claim 1, characterised in that compound A is a polyalkylene glycol, namely polyethylene glycol, polypropylene glycol, polytetramethylene glycol or polyethylenepropylene glycol.

6. Thread according to claim 1, characterised in that compound A is $HOCH_2CH_2OOC-C_{34}H_{68}-COOCH_2CH_2OH$ or $HOCH_2CH_2OOC-C_{34}H_{68}-COO-(CH_2CH_2O)_{y_1}-COC_{34}H_{68}COOCH_2CH_2OH$ where $y_1$ is equal to 22, 33 or 90.

7. Thread according to claim 1, characterised in that the proportion of the basic-dyeable polyester filament is 5 to 100%.

8. Thread according to claim 7, characterised in that the texturised polyester filament is a false-twist draw-texturised filament.

9. Thread according to claims 1, 2 or 5–7, characterised in that it contains a second component which consists of a synthetic and/or natural filament or staple yarn.

10. Thread according to claim 9, characterised in that the synthetic filament has been draw-texturised.

11. Thread according to claim 9, characterised in that the synthetic filament or staple yarn consists of polyester, viscose, acrylic or nylon and the natural staple yarn consists of wool or cotton.

12. Thread according to claim 1, characterised in that compound A is a polyolefine, namely polyethylene or polypropylene.

13. Thread according to claim 3, characterised in that compound A is a polyalkylene glycol, namely polyethylene glycol, polypropylene glycol, polytetramethylene glycol or polyethylenepropylene glycol.

14. Thread according to claim 3, characterised in that compound A is $HOCH_2CH_2OOC-C_{34}H_{68}-COOCH_2CH_2OH$ or $HOCH_2CH_2OOC-C_{34}H_{68}-COO-(CH_2CH_2O)_{y_1}-COC_{34}H_{68}COOCH_2CH_2OH$ where $y_1$ is equal to 22, 33 or 90.

15. Thread according to claim 3, characterised in that compound A is a polyolefine, namely polyethylene or polypropylene.

* * * * *